United States Patent
Talyansky

(10) Patent No.: US 9,495,220 B2
(45) Date of Patent: Nov. 15, 2016

(54) SELF-MANAGEMENT OF REQUEST-CENTRIC SYSTEMS

(71) Applicant: Roman Talyansky, Haifa (IL)

(72) Inventor: Roman Talyansky, Haifa (IL)

(73) Assignee: SAP SE, Walldorf (DE)

( * ) Notice: Subject to any disclaimer, the term of this patent is extended or adjusted under 35 U.S.C. 154(b) by 564 days.

(21) Appl. No.: 13/629,825

(22) Filed: Sep. 28, 2012

(65) Prior Publication Data

US 2014/0095674 A1    Apr. 3, 2014

(51) Int. Cl.
G06F 15/177 (2006.01)
G06F 9/50 (2006.01)
H04L 12/24 (2006.01)

(52) U.S. Cl.
CPC ........... *G06F 9/5061* (2013.01); *G06F 15/177* (2013.01); *H04L 41/0823* (2013.01); *H04L 41/5025* (2013.01)

(58) Field of Classification Search
CPC .......... H04L 12/2417; H04L 41/0823; H04L 41/5025; H04L 29/06; H04L 29/08072; H04L 29/08981; H04L 41/0806; H04L 41/12; G06F 15/177; G06F 9/5064; G06F 9/5061
USPC .................................. 709/220, 228; 710/104
See application file for complete search history.

(56) References Cited

U.S. PATENT DOCUMENTS

| | | | | |
|---|---|---|---|---|
| 8,151,269 B1* | 4/2012 | Brown | ............. | G06F 17/30306 707/713 |
| 2002/0198995 A1* | 12/2002 | Liu | ......................... | H04L 29/06 709/226 |
| 2003/0046396 A1* | 3/2003 | Richter | ................... | G06F 9/505 709/226 |
| 2006/0190605 A1* | 8/2006 | Franz | ................. | G06Q 10/0631 709/226 |
| 2007/0022142 A1* | 1/2007 | Palmer | ................... | G06Q 10/06 |
| 2007/0115966 A1* | 5/2007 | Tzeng | ................... | H04L 45/742 370/389 |
| 2008/0091806 A1* | 4/2008 | Shen | ..................... | G06F 9/5061 709/223 |
| 2011/0112694 A1* | 5/2011 | Bash | .................... | F24F 11/0001 700/277 |
| 2012/0331135 A1* | 12/2012 | Alon | .................... | H04L 41/044 709/224 |

\* cited by examiner

*Primary Examiner* — Anthony Mejia
*Assistant Examiner* — Mehulkumar Shah
(74) *Attorney, Agent, or Firm* — Fish & Richardson P.C.

(57) ABSTRACT

Methods, systems, and computer-readable storage media for configuring a request-centric system. Implementations include actions of monitoring operation of the request-centric system to determine a workload of the request-centric system, wherein the workload includes a plurality of requests, determining a mapping function based on a utility function, the workload and a configuration, the mapping function mapping the workload and the configuration into the utility function, determining an optimal configuration based on the mapping function, the optimal configuration allocating resources of the request-centric system to achieve one or more predefined goals, and applying the optimal configuration to the request-centric system.

16 Claims, 4 Drawing Sheets

SELF-MANAGEMENT OF REQUEST-CENTRIC SYSTEMS

BACKGROUND

In general, request-centric systems (RCSs), such as file systems and database systems, serve workloads that can include external workloads and/or internal workloads. An external workload is generated by one or more external clients (e.g., applications that provide input/output (I/O) requests to a storage system). An internal workload is generated by the system itself (e.g., the system restores a destroyed replica and the replica recovery process generates an internal I/O workload).

The owners of a RCS can enable users to set quality of service (QoS) goals. In some examples, the QoS goals can include performance goals (e.g., throughput rate, response time, etc.), durability, high availability goals and/or other system-specific technical and business goals. In some examples, goals are expressed in the form of service level agreements (SLAs). In some examples, the goals are associated with penalties that can be applied when one or more goals are not met. Consequently, the owner of a RCS has incentives to maintain QoS goals. On the other hand, the owners of a RCS want to keep the total cost of ownership (TCO) as low as possible. Accordingly, managing a RCS can be performed with the goal of optimizing TCO subject to maintaining QoS goals. Owners may seek to achieve other goals.

SUMMARY

Implementations of the present disclosure include computer-implemented methods for configuring a request-centric system. Implementations include actions of monitoring operation of the request-centric system to determine a workload of the request-centric system, wherein the workload includes a plurality of requests, determining a mapping function based on a utility function, the workload and a configuration, the mapping function mapping the workload and the configuration into the utility function, determining an optimal configuration based on the mapping function, the optimal configuration allocating resources of the request-centric system to achieve one or more predefined goals, and applying the optimal configuration to the request-centric system.

In some implementations, the optimal configuration allocates resources of the request-centric system across service levels associated with the plurality of requests.

In some implementations, the plurality of requests includes one or more of a read request, a write request, a transaction request and an analytical query.

In some implementations, the mapping function is determined further based on a calibration associated with the request-centric system.

In some implementations, the calibration is provided based on applying a mixed workload to the request-centric system, the mixed workload including one or more of read requests, write requests, transaction requests and analytical queries.

In some implementations, the calibration includes a throughput and average completion time associated with each read request, write request, transaction request or analytical query.

In some implementations, the utility function is provided based on one or more service levels and the one or more predefined goals.

In some implementations, the one or more service levels are defined in service level agreements (SLAs) between an operator of the request-centric system and respective clients that use the request-centric system.

In some implementations, the SLAs define one or more penalties that can be applied if service levels are not achieved by the request-centric system.

In some implementations, the optimal configuration minimizes penalties for the workload.

In some implementations, the one or more predefined goals include at least one of minimizing a total cost of ownership associated with the request-centric system, minimizing a number of performance-based violations, minimizing an amount of financial penalties resulting from performance-based violations and retaining customers.

In some implementations, the request-centric system includes at least one of a file system, a database system, a web server and an application server.

In some implementations, the workload is characterized based on a time between requests and a completion time of requests.

In some implementations, each request is partitioned into slices.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to self-management of request-centric systems (RCSs). More particularly, implementations of the present disclosure are directed to a controllable trade-off (CTO) system that enables an optimal configuration to be applied to a RCS. In some implementations, the optimal configuration determines the number of resources that are allocated to address requests based on respective quality of service (QoS) goals associated with the requests. In some examples, requests are provided as part of a workload applied to the RCS and can include input/output (I/O) requests. In some examples, the optimal configuration is determined based on the workload, defined service level agreements (SLAs) (which provide the QoS goals) and defined system goals. In some examples, a utility function (UF) is provided that defines the utility of the RCS with respect to system goals.

In some implementations, the optimal configuration is applied using a virtual control knob. That is, and in some examples, the control knob is provided as a software-based artifact and is not a physical artifact. In some examples, the virtual control knob is provided using an application program interface (API) that enables the system configuration to be changed. In some examples, a value that is applied to the RCS using the virtual control knob is called a configuration that defines the allocation of resources. In this manner, the CTO system enables users to provide multiple QoS goals of various types, with the virtual control knob enabling changes in the allocation of the system resources between workloads of different QoS types. In some examples, managing a RCS in accordance with implementations of the present disclosure can be performed with the goal of optimizing the total cost of ownership (TCO) subject to maintaining QoS goals. In some examples, the owners of the RCS may want to keep the TCO as low as possible, while retaining customers. In some examples, managing a RCS can be performed with the goal of minimizing TCO subject to maintaining QoS goals or to violating QoS with low penalties if this step maximizes the total revenues.

Implementations of the present disclosure are discussed in further detail below in view of an example context. The example context includes slice-based requests. It is appreciated, however, that implementations of the present disclosure are applicable in other contexts (e.g., probabilistic rejection of requests).

Figure 1:
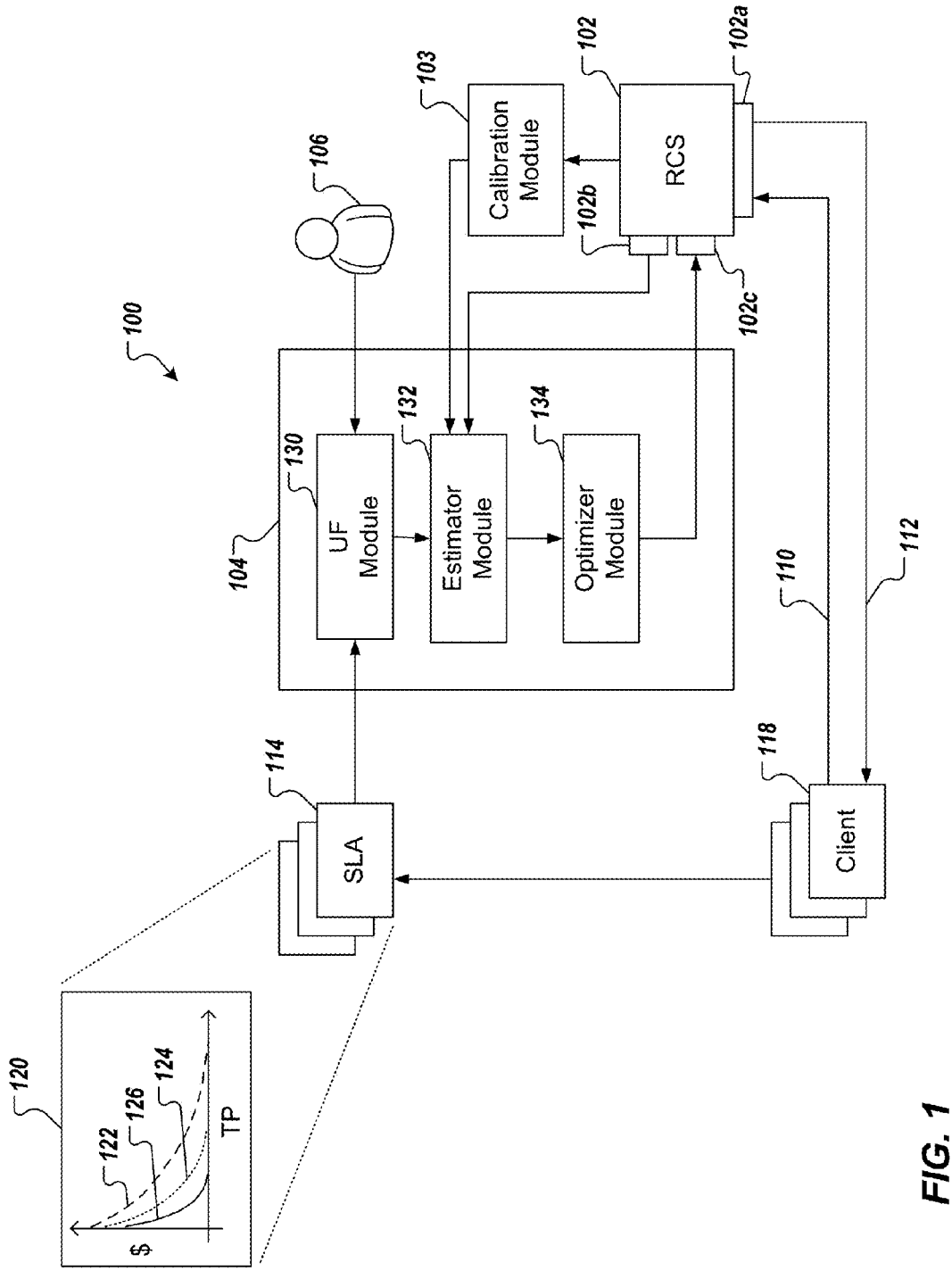
FIG. 1 depicts an example system architecture in accordance with implementations of the present disclosure.

FIG. 1 depicts an example system architecture 100 in accordance with implementations of the present disclosure. The system architecture 100 includes an RCS 102, a calibration module 103 and a CTO system 104. In some examples, the RCS 102 can be a file system and/or a database system. In some examples, the RCS 102 can be a cloud-based file and/or data storage system. In the depicted example, an owner 106 (e.g., a service provider (person, company)) manages the RCS 102 and the CTO system 104. In some examples, a plurality of clients 118 collectively apply a workload to the RCS 102. In some examples, each client 118 can include one or more computing devices and/or one or more computer-executable programs that apply the workload to the RCS 102. In some examples, the workload includes requests 110 applied to the RCS 102. In some examples, the calibration module 103 applies a synthetic workload to RCS 102 to build the calibration. The RCS 102 provides respective responses 112 based on the requests 110.

Implementations of the present disclosure use slice-based storage. More particularly, requests 110 received from clients 118 can each be provided as one or more data objects. Each data object can be partitioned into slices, where each slice is provided as a portion of the data object. In some examples, slices are of the same size. In some examples, each slice is associated with the service level type (discussed in further detail below) corresponding to the service level type of the respective request from which the slices are provided.

In some implementations, the RCS 102 includes multiple APIs associated therewith. In the depicted example, the RCS 102 includes a data API 102a, a monitoring API 102b and a configuration API 102c. In some examples, the RCS 102 can receive a workload over the data API 102a. In some examples, the RCS 102 can provide workload data (e.g., data regarding the current workload applied to the RCS 102) to the CTO system 104 over the monitoring API 102b. In some examples, the RCS 102 can receive a configuration setting from the CTO system 104 over the configuration API 102c.

In some examples, the calibration module 103 can be provided as one or more computer-executable programs that can be executed using one or more computing devices. In some examples, the calibration module 103 receives performance data from the RCS 102 as the RCS processes workloads. In some examples, the calibration module 103 can provide RCS performance data that can include an association between the workload and the RCS performance. For example, an output of the calibration module 103 for the estimator module 132 can be provided as multi-dimensional tables that define an association between each I/O request, the throughput and average completion time.

In some implementations, each client 118 is associated with a SLA 114. In some examples, each SLA 114 defines QoS goals expected of the RCS 102 and that have been agreed between the owner 106 and an operator of the respective client 118. In some examples, each QoS goal can include a performance goal that can reflect an expected metric or a combination of metrics from the RCS 102. Example metrics can include throughput (TP) and response time (RT) among others. For purposes of illustration, implementations of the present disclosure are discussed using TP as an example metric. It is appreciated, however, that implementations of the present disclosure are also applicable to other metrics.

In accordance with implementations of the present disclosure, each SLA 114 defines a QoS type for each expected metric. In some examples and with reference to the example metric TP, the owner 106 can define multiple types of TP service levels. For example, a first TP service level can be provided as a "Gold" (G) service level, a second TP service level can be provided as a "Silver" (S) service level, and a third TP service level can be provided as a "Bronze" service level. In some examples, the Gold service level can reflect an expected TP of 10 MB/s, the Silver service level can reflect an expected TP of 5 MB/s, and the Bronze service level can reflect an expected TP of 1 MB/s. In some examples, each SLA type (e.g., Gold, Silver, Bronze) is associated with a non-constant penalty. In the depicted example, non-constant penalties are depicted in a graph 120 that provides respective curves 122, 124, 126 associated with the Gold, Silver and Bronze SLA types. In the depicted example, penalties are provided in terms of money that is to be paid by the operator 106 if the expected metric (e.g., TP) is not achieved. In some examples, penalties can be provided if one or more expected metrics and/or a combination of expected metrics are not achieved.

Continuing with the example metric TP, TP can be measured separately for read (r) and write (w) operations. Accordingly, the following example relationship can be provided:

$$TP = (TP_{r,G}, TP_{r,S}, TP_{r,B}, TP_{w,G}, TP_{w,S}, TP_{w,B}).$$

In some implementations, the operator 106 defines one or more system goals for the RCS 102. The system goals can reflect goals that the operator 106 expects to be achieved by the RCS 102. In some examples, the system goal can be to minimize the number of SLA violations. In some examples, the system goal can be to minimize the system resources such that less demanding SLAs are violated, but revenues are maximized. In some examples, the system goal can be to minimize the total penalties. In some examples, the system goals are defined by the operator 106 using a UF.

For purposes of illustration, implementations of the present disclosure are discussed using minimization of the total penalties as an example system goal. It is appreciated, however, that implementations of the present disclosure are also applicable to other system goals.

In some examples, respective penalty functions can be defined analytically for TP. Example penalty functions can be provided as:

$$Pen_{r,G}(TP_{r,G})=Pen_{r,G,max}e^{a_c TP_{r,G}}$$

$$Pen_{w,G}(TP_{w,G})=Pen_{w,G,max}e^{a_c TP_{w,G}}$$

$$Pen_{r,S}(TP_{r,S})=Pen_{r,S,max}e^{a_c TP_{r,S}}$$

$$Pen_{w,S}(TP_{w,S})=Pen_{w,S,max}e^{a_c TP_{w,S}}$$

$$Pen_{r,B}(TP_{r,B})=Pen_{r,B,max}e^{a_c TP_{r,G}}$$

$$Pen_{w,B}(TP_{w,B})=Pen_{w,B,max}e^{a_c TP_{w,B}}$$

In the context of the example system goal, a UF can be defined as the total sum of penalties:

$$UF=UF(TP)=Pen_{r,G}+Pen_{r,S}+Pen_{r,B}+Pen_{w,G}+Pen_{w,S}+Pen_{w,B}$$

In some examples, at a peak load time, the RCS 102 cannot guarantee that all the SLAs will be met. Consequently, one or more SLAs might be violated (e.g., the Gold service level might be violated). In accordance with implementations of the present disclosure, as discussed in further detail herein, an optimal configuration of the RCS 102 can be determined by the CTO system 104 based on the example system goal of minimizing the total penalties paid. For example, the CTO system 104 can configure the RCS 102, such that the RCS 102 delays processing of requests of Silver and/or Bronze workloads in order to speed up servicing requests of a Gold workload. In this manner, the QoS for the Gold workload is kept above its expected metric (e.g., 10 MB/s) in an effort to minimize the total penalty amount paid.

Referring again to FIG. 1, the CTO system 104 includes a UF module 130, an estimator module 132 and an optimizer module 134. In some examples, the CTO system 104 can be provided as one or more computer-executable programs that can be executed using one or more computing devices. In some examples, each of the UF module 130, the estimator module 132 and the optimizer module 134 can be provided as one or more computer-executable programs that can be executed using one or more computing devices. In some examples, the UF module 130 receives input based on the SLAs (e.g., QoS goals) agreed to clients and input from the operator 106 to define one or more system goals. The UF module 130 defines a UF based on the received input and provides the UF to the estimator module 132. In some examples, the estimator module 132 receives input from the RCS 102 (e.g., current workload data) and the calibration module 103 to generate a mapping, as discussed in further detail herein. In some examples, the optimizer module 134 receives input from the estimator module 134 and applies a configuration to the RCS 102 using the configuration API 102c. As discussed herein, the optimal configuration can be provided based on the QoS types (e.g. Gold, Silver and Bronze) and the system goals defined by the operator 106.

In further detail, the clients 118 apply a workload to the RCS 102. The workload includes the I/O (write/read) requests. In some examples, monitoring data associated with processing of the workload is passed to the estimator module 132 via the monitoring API 102b. The estimator module 132 computes a mapping ($f_{PRED}$) that associates a workload characterization (WLC) and one or more configurations (C) with the UF. For example:

$$f_{PRED}:WLC \times C \rightarrow UF$$

In some examples, the WLC characterizes a workload based on the I/O requests and one or more parameters. Example parameters can include time between requests. The mapping provided by the estimator module 132 is provided to the optimizer module 134. Based on the mapping, the optimizer module 134 determines a configuration that minimizes the UF under the current workload (the optimal configuration).

The optimizer module 134 applies the optimal configuration to the RCS 102 over the configuration API 102c to tune the RCS 102 for the current workload. For example, the optimizer module 134 can apply a configuration in the example form:

$$C=(n_{r,G},n_{r,S},n_{r,B},n_{w,G},n_{w,S},n_{w,B}),$$

where $n_{r,G}$, $n_{r,S}$, $n_{r,B}$, $n_{w,G}$, $n_{w,S}$, $n_{w,B}$ are real numbers indicating the number of workload slices corresponding to a particular slice-allocation policy. (Another example of a configuration that may be applied to a virtual control node is a sequence of probability numbers in the interval [0;1]). That is, the configuration can define a slice-allocation policy that defines the allocation of system resources across service level types. An example slice-allocation policy can define the respective number of slices that are to be processed across the defined service level types. For example, a slice-allocation policy can provide that for each $n_{r,G}$ Gold read slices, resource access is provided for $n_{r,S}$ Silver read slices and $n_{r,B}$ Bronze read slices (e.g., for every 5 Gold read slices ($n_{r,G}=5$), resource access is provided to only 3 Silver read slices ($n_{r,S}=3$) and 1 Bronze read slice ($n_{r,B}=1$). Slice-allocation policies for write slices can likewise be provided.

In some implementations, the slice-allocation policy enables simultaneous control over one or more key performance indicators (KPIs) (e.g., TP and latency). With continued reference to TP as an example metric and minimization of total penalties paid as an example system goal, TP penalties for the Gold service level are higher than for the Silver service level. Accordingly, and in the example context, the configuration (which applies a slice-allocation policy) can be used to manage slice access to system resources (e.g., threads, raw storage) to speed up processing of Gold requests. The selective increase of Gold request processing can increase TP of the Gold requests at the expense of Silver and/or Bronze requests. In some examples (e.g., to address latency-based SLAs), the configuration can apply a slice-allocation policy that can speed up processing for the first slice of each Silver request, for example, while simultaneously optimizing processing for TP SLAs.

Figure 2:
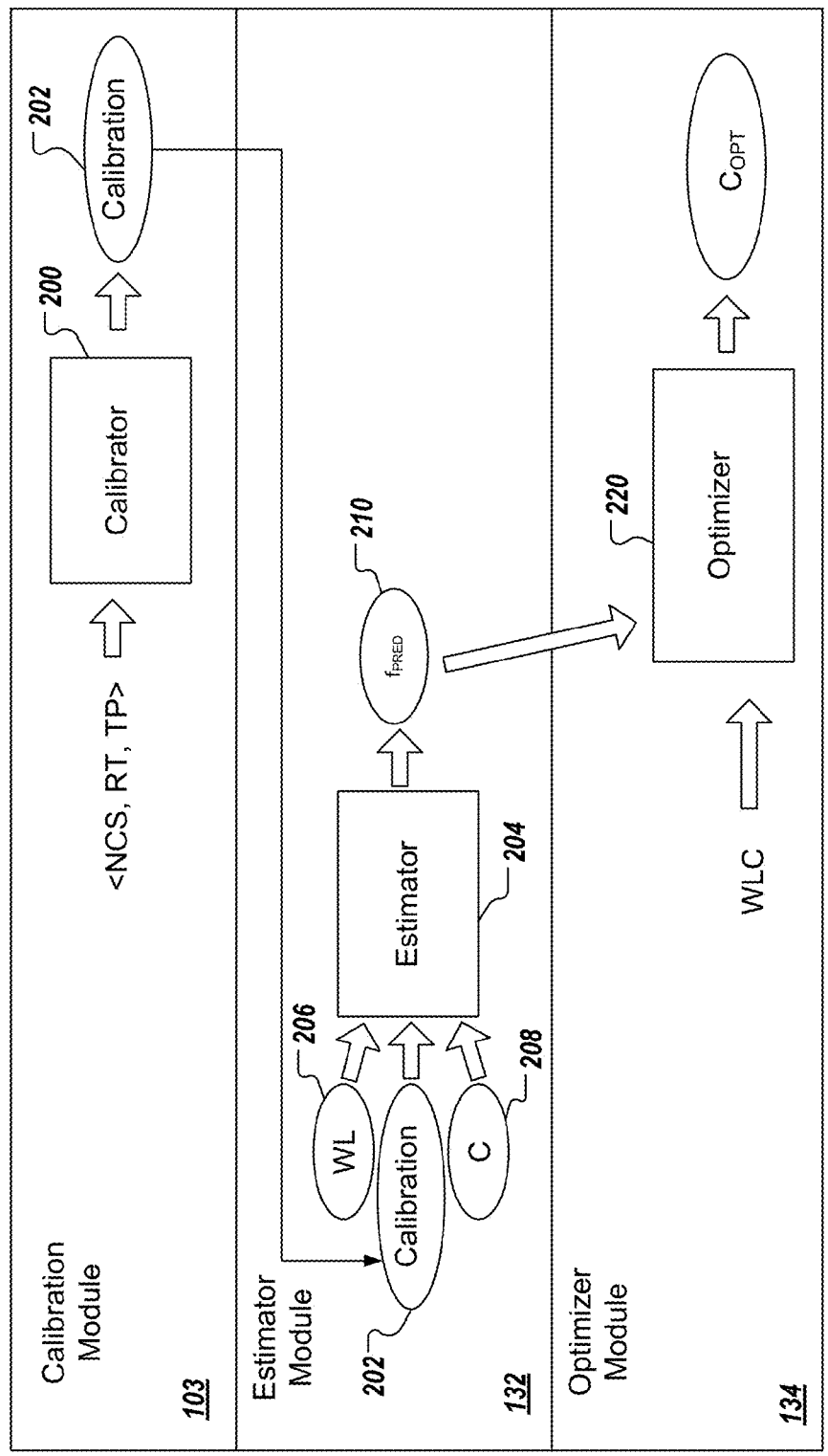
FIG. 2 depicts example interactions between components in accordance with implementations of the present disclosure.

FIG. 2 depicts example interactions between components in accordance with implementations of the present disclosure. In some implementations, the calibration module 103 includes a calibrator 200 that performs calibration of the RCS 102. In some examples, calibration can be performed after the RCS 102 has been set up and is operational. In some examples, calibration can be re-performed if changes are made to the RCS 102 (e.g., resources (threads, memory) are added or removed). In some implementations, the calibration module 103 can apply a mixed write and read (I/O) workload to the RCS 102. Each read and write workload can be characterized in terms of a number of concurrent operations (COPS). Read concurrent operations RCOPS can be defined as the number of read requests that are simultaneously applied to the storage. Write concurrent operations WCOPS can be defined as the number of write requests that are simultaneously applied to the storage. In some implementations, for each read or written request, a normalized completion time (CT) (e.g. the time between accessing the first byte and the time to access the last byte of the request, divided by the request length), TP and/or average completion time can be recorded. The calibrator 200 processes the RCOPS, WCOPS, CT and TP to generate a calibration 202. In some examples, the calibration 202 can be provided as a computer-readable file that can include a pair of multi-dimensional calibration tables (e.g., a read table and a write table). The calibration tables can indicate the association of each I/O workload with the TP and the CT.

The estimator module 132 includes an estimator 204 that generates the mapping function $f_{PRED}$, which maps a workload characterization (WL) 206 and a configuration (C) 208 into the value of the UF. In some implementations, the estimator 204 processes the calibration 202, the WL 206 and the C 208 to provide the mapping function 210. In some implementations, the WL 206 is provided by via the monitoring API 102b from the RCS 102. In some examples, the WL 206 can be provided from an external monitoring module that is provided between the clients 118 and the RCS 102. In some implementations, the configuration (C) is a free variable. That is, the estimator 204 can provide the mapping 210 using any arbitrary configuration (C) that can be applied to the RCS 102.

As discussed above, the configuration (C) for read and write operations can be expressed as:

$$C=(n_{r,G}, n_{r,S}, n_{r,B}, n_{w,G}, n_{w,S}, n_{w,B}).$$

In some implementations, the expression for configuration can be simplified by normalizing each part of the configuration (C) to 1. For example, the following example relationships can be for Gold, Silver and Bronze service levels:

$$n_{r,G}+n_{r,S}+n_{r,B}=1$$

$$n_{w,G}+n_{w,S}+n_{w,B}=1$$

In some implementations, the estimator 204 uses multiple functions to provide the mapping 210. In some implementations, the functions are interdependent. Example functions include an estimate constrained workload function (EstimateConstrainedWL), a span concurrent requests probability function (SpanCRProb), refine completion time function (RefineCT) and an iterative procedure function (IterativeProcedure).

In some implementations, the estimate constrained workload function process inputs including the workload characterization (WL), the configuration (C) and an estimate of the read and write completion times (e.g., provided from the calibration 202). In some examples, the estimate can be refined iteratively. The output of the estimate constrained workload function is the constrained workload. For example, the output can be the estimation of the workload when the configuration that can be assigned to the RCS 102 is the configuration (C) provided as input to the estimator 204. The estimator uses normalized think time that is provided by monitoring API. A normalized think time of a user of QoS type QoSType and read operation is defined as the time from the completion of one read request of the user till the time when the user applies the next read request to RCS, divided by the request length. An average think time $TT_{r,QoSType}$ of users of QoS type QoSType for read operation is an average think time of those users in a defined period of time. An average think time $TT_{w,QoSType}$ of users of QoS type QoSType for write operation is defined in a similar manner. The estimator also uses an estimated average completion time for read operations $CT_{r,cur}$ of RCS that is defined as a sum of request completion times for all the requests that are applied to RCS in a defined period of time regardless of their QoS type, divided by the sum of the sizes of those requests. An estimated average completion time for write operations $CT_{w,cur}$ of RCS is defined in a similar manner. In some implementations, the estimate constrained workload function estimates the number of unconstrained concurrent requests per QoS type (QoSType) (e.g., Gold, Silver, Bronze service levels). For example, for read operations, the estimated number of unconstrained concurrent requests can be expressed as:

$$CR_{r,Unconstr,QoSType} = numClients_{QoSType} \frac{CT_{r,cur}}{CT_{r,cur} + TT_{r,QoSType}}$$

As another example, for write operations, the estimated number of unconstrained concurrent requests can be expressed as:

$$CR_{w,Unconstr,QoSType} = numClients_{QoSType} \frac{CT_{w,cur}}{CT_{w,cur} + TT_{w,QoSType}}$$

where CT denotes completion time and TT denotes think time.

In some implementations, the estimate constrained workload function estimates the constrained concurrent requests (CR) by fitting the unconstrained concurrent requests into the respective configuration constraint. For example, the configuration constraint for read can be provided as $C_r=n_{r,G}$, $n_{r,S}$, $n_{r,B}$ and the configuration constraint for write can be provided as $C_w=n_{w,G}$, $n_{w,S}$, $n_{w,B}$. In some implementations, the think time in the read and write workloads per QoS type is updated to match the constrained CR and the resulting workload is provided as output.

Referring now to the span concurrent requests probability function, the WLC and a storage completion time are provided as inputs. During a control period the number of concurrent requests can vary. In some examples, the control period is provided as a time period during which a configuration is applied to the RCS. In some examples, the duration of the control period is defined such that WL does not significantly change during the control period. The purpose of the span concurrent requests probability function is to estimate the probability of different values of concurrent requests of reads and writes during the defined time period. In some implementations, the span concurrent requests probability function identifies the probability of the concurrent requests that are read or written simultaneously for each number of concurrent requests within a given set (e.g., from 0 to a maximum number of concurrent requests). In some implementations, the refine concurrent requests probability function estimates the probability of having a different number of concurrent read and write requests up to the maximum number of concurrent requests. In some examples, the value of the maximum number of concurrent requests is chosen such that the probability of the number of read or write concurrent requests exceeding a stop condition is negligible.

An example implementation of the refine concurrent requests probability function can be provided as follows. Define probabilities of i concurrent read and write requests for QoS type Q as $$Pr_{Q,r}(i) = \binom{NClients_r[Q]}{i} \cdot \left[\frac{RT_{r,cur}}{RT_{r,cur}+TT_{r,Q}}\right]^i \left[\frac{TT_{r,Q}}{RT_{r,cur}+TT_{r,Q}}\right]^{NClients_r[Q]-i}$$

and $$Pr_{Q,w}(i) = \binom{NClients_w[Q]}{i} \cdot \left[\frac{RT_{w,cur}}{RT_{w,cur}+TT_{w,Q}}\right]^i \left[\frac{TT_{w,Q}}{RT_{w,cur}+TT_{w,Q}}\right]^{NClients_w[Q]-i}$$

Then probability of cr concurrent read or write requests is $$\text{for}(cr = 0; cr < \text{maxCR}; cr++)$$
$$ProbNReq_r(cr) = \sum_{i,j,k:i+j+k=cr} Pr_{G,r}(i) \cdot Pr_{S,r}(j) \cdot Pr_{B,r}(k)$$
$$ProbNReq_w(cr) = \sum_{i,j,k:i+j+k=cr} Pr_{G,w}(i) \cdot Pr_{S,w}(j) \cdot Pr_{B,w}(k)$$
$$\text{endfor}$$
$$\text{return } (ProbNReq_r, ProbNReq_w)$$

Assume that the vectors $ProbNReq_r$ and $ProbNReq_w$ are column vectors.

In some examples, the refine concurrent requests probability function applied to read and write concurrent slices for the example Gold, Silver and Bronze service levels can be respectively expressed as:

$$ProbNSlice_r^* = \left(\frac{TT_{r,QoSType}}{RT_{r,cur}+TT_{r,QoSType}}\right)^{NClients[QoSType]}$$

$$ProbNSlice_w^* = \left(\frac{TT_{w,QoSType}}{RT_{w,cur}+TT_{w,QoSType}}\right)^{NClients[QoSType]}$$

Referring now to the calculation of refine completion time function (RefineCT), the output of the span concurrent request probability function is processed. The output of refine completion time function is a refined estimation of the read and write completion time at the raw storage regardless QoS type of the requests (e.g., average read and write completion time per request of a unit size, e.g. one megabyte). The refine completion time function uses calibration tables $CalibCT_r(cr)$ and $CalibCT_w(cr)$ that associate a completion time of read and write requests of a unit size with different numbers of concurrent read and write requests. In some examples, the calculation of refine completion time function applied to read and write concurrent requests can be respectively expressed as:

$$CT_{r,cur} = CT_{w,cur} = 0$$
$$\text{for}(cr = 0; cr < \text{maxCR}; cr++)$$
$$CT_{r,cur} += CalibCT_r(cr) \cdot ProbNReq_r(cr)$$
$$CT_{w,cur} += CalibCT_w(cr) \cdot ProbNReq_w(cr)$$
$$\text{endfor}$$

Referring now to the iterative procedure, the workload characterization, the configuration and a stop condition (e.g., a constant epsilon) can be processed. The output of the iterative procedure can be an estimation of the read and write normalized completion time in the raw storage regardless QoS type of requests and TP per each QoS type for the given workload characterization and configuration. In some examples, the iterative procedure uses the other above-described functions (i.e., the estimate constrained workload function, the refine concurrent requests probability function and the refine completion time function).

In some examples, the iterative procedure includes the retrieval of current completion time. In some examples, the iterative procedure includes the calculation of the constrained workload using the output of the estimate constrained workload as function of the workload, configuration and current completion time. The iterative procedure includes the calculation of the span of concurrent requests probabilities for read and write operations using the span concurrent requests probability as function of constrained workload and current completion time. The iterative procedure includes the calculation of the refined completion time using the calculation of the refine completion time as function of the span of concurrent requests probability and the calibration. In some implementations, the iterative procedure is repeated if the sum of the read and write absolute difference between the previous and current completion times CT is higher than the stop condition (e.g., $\epsilon: |CT_{prev,r} - CT_{cur,r}| + |CT_{prev,w} - CT_{cur,w}| > \epsilon$). In some implementations, the iterative procedure returns the estimation of the number of concurrent requests, completion time and throughput per each QoS type if the sum of the read and write absolute difference between the previous and current completion times is smaller than the stop condition (e.g., $|CT_{prev,r} - CT_{cur,r}| + |CT_{prev,w} - CT_{cur,w}| < \epsilon$). The estimation of the throughput of RCS results from application of calibration mappings $cr_r \rightarrow TP_r$ and $cr_w \rightarrow TP_w$ to the estimation of the concurrent requests at RCS. Knowing the total throughput at RCS, an estimation of TP per QoS type is given by applying a normalized configuration $C=(n_{r,G}, n_{r,S}, n_{r,B}, n_{w,G}, n_{w,S}, n_{w,B})$ to $TP_r$ and $TP_w$ $$TP_{r,G} = n_{r,G} \cdot TP_r, \ TP_{r,S} = n_{r,S} \cdot TP_r, \ TP_{r,B} = n_{r,B} \cdot TP_r$$

$$TP_{w,G} = n_{w,G} \cdot TP_w, \ TP_{w,S} = n_{w,S} \cdot TP_w, \ TP_{w,B} = n_{w,B} \cdot TP_w$$

Knowing TP per each QoS type for read and write operations, one can calculate the value of utility function UF, using the definition of UF.

With continued reference to the estimator, for an input characterization of the current workload WL and the arbitrary configuration (e.g., $C=(n_{r,G}, n_{r,S}, n_{r,B}, n_{w,G}, n_{w,S}, n_{w,B})$), the output is the predicted, or estimated mapping based on the UF.

In some implementations, the optimizer module 134 includes an optimizer 220 that receives the mapping function 210 from the estimator 204 and processes the mapping function 210 to search for an optimal configuration ($C_{OPT}$)

for the current workload characterization (WLC). In some implementations, the optimizer 220 assigns the current workload characterization provided by the monitoring API 102b into the mapping function. In some implementations, the optimizer 220 searches for a configuration that minimizes the UF, and the configuration associated with the minimal UF is provided as the optimized configuration. For example, the optimizer 220 searches, for all QoS types, a read and write configuration that is greater or equal to zero and that minimizes the UF. The optimal configuration is applied to the RCS 102 using the configuration API 102c.

Figure 3:
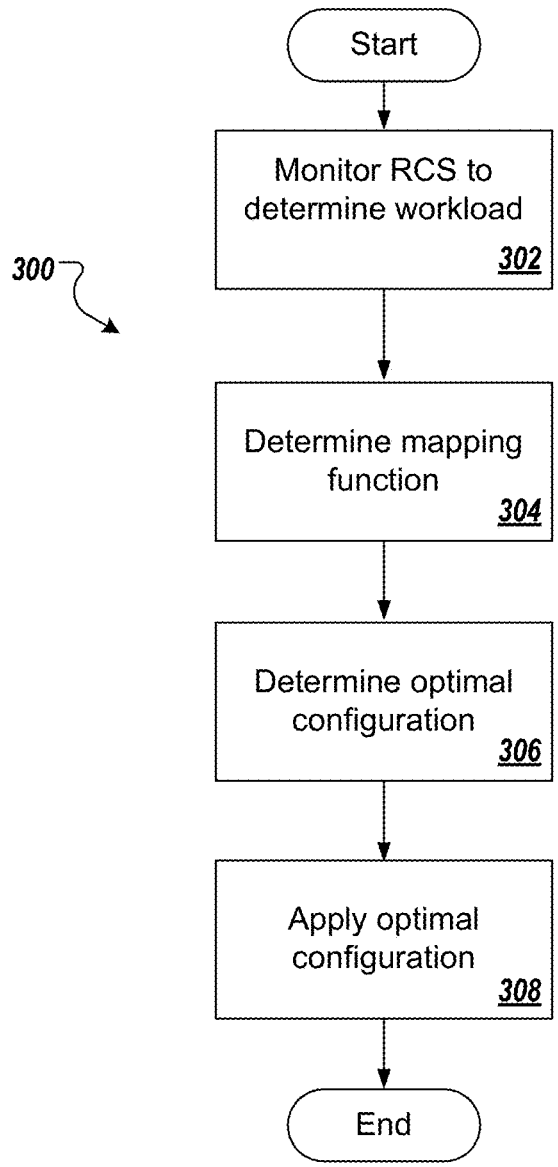
FIG. 3 depicts an example process that can be executed in implementations of the present disclosure.

FIG. 3 depicts an example process 300 that can be executed in implementations of the present disclosure. In some implementations, the example process 300 can be implemented using one or more computer-executable programs that can be executed using one or more computing devices.

Operation of the RCS is monitored to determine a current workload (WLC) of the RCS (302). The workload, a configuration and a calibration are processed to determine a mapping function (304). The mapping function maps the workload and the configuration into the utility function. An optimal configuration is determined based on the mapping function (306). The optimal configuration is applied to the RCS (308).

Implementations of the present disclosure enable optimized self-management of RCSs. In accordance with implementations of the present disclosure, the quality and efficiency of optimizing RCS configurations for a given set of planned workloads are enhanced to satisfy client goals (e.g., defined service levels of agreement), having a positive effect on client experience and retention. Further, the optimized self-management of the RCS can also satisfy the goals of the operator of the RCS. Such goals can include, for example, minimizing a total cost of ownership associated with the RCS, minimizing a number of performance-based violations (e.g., decreasing number of penalties for violation of SLAs) and minimizing an amount of financial penalties resulting from performance-based violations. Further, implementations of the present disclosure enable consistent identification of optimal configuration based on periodic analysis of workload characterization and predefined goals.

Figure 4:
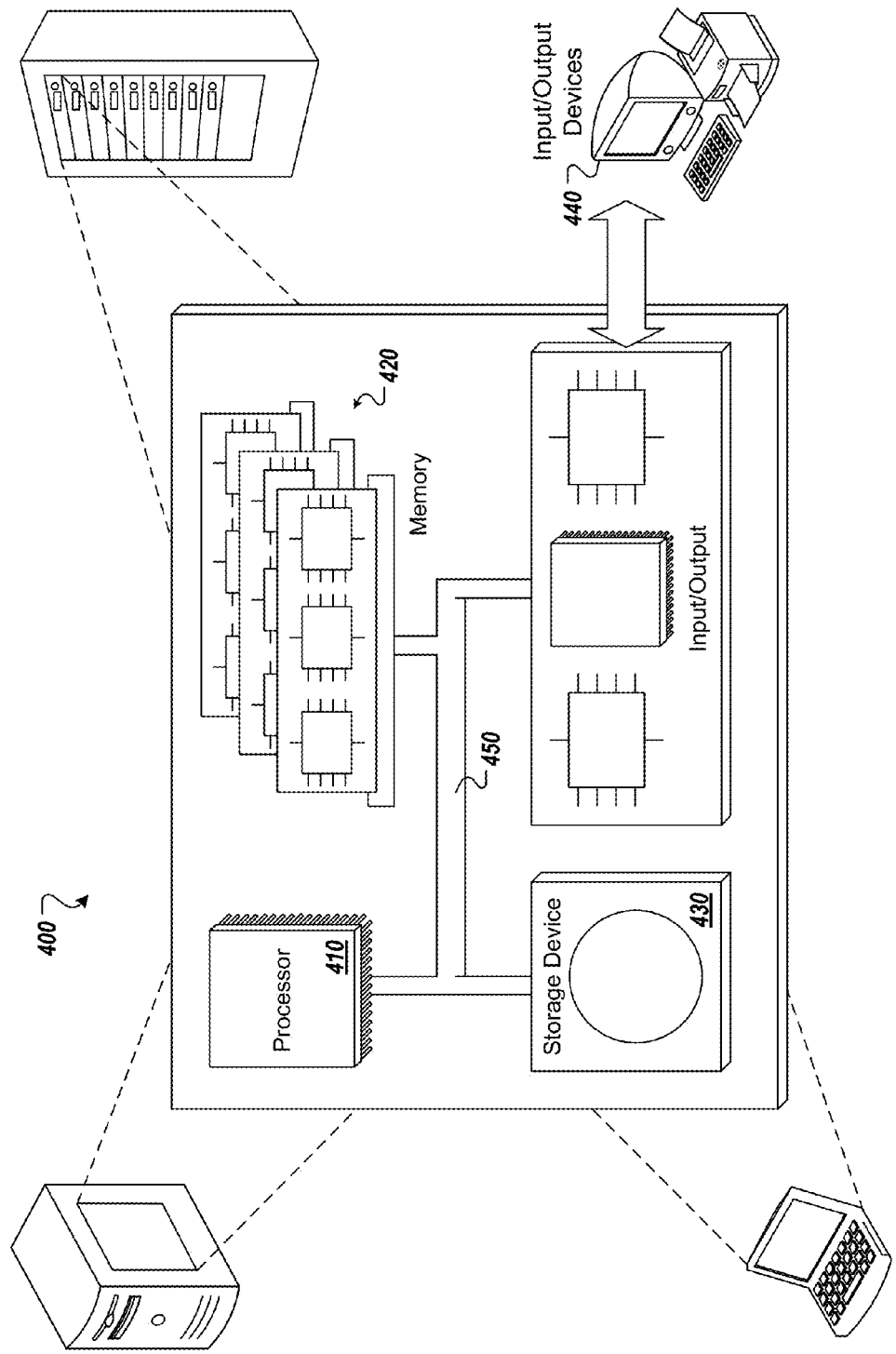
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor receives instructions and data from a read-only memory or a random access memory or both. Elements of a computer are a processor for executing instructions and one or more memories for storing instructions and data. Generally, a computer also includes, or is operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for configuring a request-centric system, the method being executed using one or more processors and comprising:
    monitoring operation of the request-centric system to determine a workload of the request-centric system, wherein the workload comprises a plurality of requests, each of the plurality of requests being partitioned into slices of equal size and the request-centric system comprising at least one of a file storage system and a data storage system;
    determining a mapping function based on a utility function, the workload and a configuration, the mapping function mapping the workload and the configuration into the utility function, the configuration applying a slice-allocation policy to manage access of the slices to resources of the request-centric system and the utility function defining a utility of the request-centric system with respect to a plurality of predefined goals and comprises a sum of a plurality of penalties associated with agreed service levels not achieved by the request-centric system, each of the plurality of penalties being defined based on a service level type and an operation type;
    determining an optimal configuration based on the mapping function, the optimal configuration allocating the resources of the request-centric system to minimize the sum of the plurality of penalties by achieving a first of the plurality of predefined goals corresponding to a first service level type and violating a second of the plurality of predefined goals corresponding to a second service level type that is inferior to the first service level type; and
    applying the optimal configuration to the request-centric system to speed up processing of a portion of the slices that correspond to the first service level type.

2. The method of claim 1, wherein the optimal configuration allocates resources of the request-centric system across service levels associated with the plurality of requests.

3. The method of claim 1, wherein the plurality of requests comprise one or more of a read request, a write request, a transaction request and an analytical query.

4. The method of claim 1, wherein the mapping function is determined further based on a calibration associated with the request-centric system.

5. The method of claim 4, wherein the calibration is provided based on applying a mixed workload to the request-centric system, the mixed workload comprising one or more of read requests, write requests, transaction requests and analytical queries.

6. The method of claim 5, wherein the calibration comprises a throughput and average completion time associated with each read request, write request, transaction request or analytical query.

7. The method of claim 1, wherein the utility function is defined by a utility function module that receives as input the one or more service levels and the one or more predefined goals and is transmitted to a generator module that is configured to generate the mapping of the workload.

8. The method of claim 1, wherein the one or more service levels are defined in service level agreements (SLAs) between an operator of the request-centric system and respective clients that use the request-centric system.

9. The method of claim 8, wherein the SLAs define one or more penalties that can be applied if service levels are not achieved by the request-centric system.

10. The method of claim 9, wherein the optimal configuration minimizes penalties for the workload.

11. The method of claim 1, wherein the one or more predefined goals comprise at least one of minimizing a total cost of ownership associated with the request-centric system, minimizing a number of performance-based violations, minimizing an amount of financial penalties resulting from performance-based violations and retaining customers.

12. The method of claim 1, wherein the request-centric system comprises at least one of a file system, a database system, a web server and an application server.

13. The method of claim 1, wherein the workload is characterized based on a time between requests and a completion time of requests.

14. The method of claim 1, wherein each of the slices is associated with one of the one or more service levels.

15. A system, comprising:
    a computing device; and
    a computer-readable storage device coupled to the computing device and having instructions stored thereon which, when executed by the computing device, cause the computing device to perform operations for configuring a request-centric system, the operations comprising:
        monitoring operation of the request-centric system to determine a workload of the request-centric system, wherein the workload comprises a plurality of requests, each of the plurality of requests being partitioned into slices of equal size and the request-centric system comprising at least one of a file storage system and a data storage system;
        determining a mapping function based on a utility function, the workload and a configuration, the mapping function mapping the workload and the configuration into the utility function, the configuration applying a slice-allocation policy to manage access of the slices to resources of the request-centric system and the utility function defining a utility of the request-centric system with respect to a plurality of predefined goals and comprises a sum of a plurality of penalties associated with agreed service levels not achieved by the request-centric system, each of the plurality of penalties being defined based on a service level type and an operation type;

determining an optimal configuration based on the mapping function, the optimal configuration allocating the resources of the request-centric system to minimize the sum of the plurality of penalties by achieving a first of the plurality of predefined goals corresponding to a first service level type and violating a second of the plurality of predefined goals corresponding to a second service level type that is inferior to the first service level type; and applying the optimal configuration to the request-centric system to speed up processing of a portion of the slices that correspond to the first service level type.

16. A non-transitory computer-readable storage medium coupled to one or more processors and having instructions stored thereon which, when executed by the one or more processors, cause the one or more processors to perform operations for configuring a request-centric system, the operations comprising:

monitoring operation of the request-centric system to determine a workload of the request-centric system, wherein the workload comprises a plurality of requests, each of the plurality of requests being partitioned into slices of equal size and the request-centric system comprising at least one of a file storage system and a data storage system;

determining a mapping function based on a utility function, the workload and a configuration, the mapping function mapping the workload and the configuration into the utility function, the configuration applying a slice-allocation policy to manage access of the slices to resources of the request-centric system and the utility function defining a utility of the request-centric system with respect to a plurality of predefined goals and comprises a sum of a plurality of penalties associated with agreed service levels not achieved by the request-centric system, each of the plurality of penalties being defined based on a service level type and an operation type;

determining an optimal configuration based on the mapping function, the optimal configuration allocating the resources of the request-centric system to minimize the sum of the plurality of penalties by achieving a first of the plurality of predefined goals corresponding to a first service level type and violating a second of the plurality of predefined goals corresponding to a second service level type that is inferior to the first service level type; and applying the optimal configuration to the request-centric system to speed up processing of a portion of the slices that correspond to the first service level type.

* * * * *